(12) United States Patent
Leutgeb et al.

(10) Patent No.: US 8,977,198 B2
(45) Date of Patent: Mar. 10, 2015

(54) COMMUNICATION METHOD BETWEEN ELECTRONIC APPLIANCES, AND CORRESPONDING APPLIANCES

(71) Applicant: Infineon Technologies AG, Neubiberg (DE)

(72) Inventors: Thomas Leutgeb, Lieboch (AT); Walter Kargl, Graz (AT); Josef Riegebauer, Styria (AT)

(73) Assignee: Infineon Technologies AG, Neubiberg (DE)

( * ) Notice: Subject to any disclaimer, the term of this patent is extended or adjusted under 35 U.S.C. 154(b) by 164 days.

(21) Appl. No.: 13/682,932

(22) Filed: Nov. 21, 2012

(65) Prior Publication Data
US 2013/0171931 A1    Jul. 4, 2013

(30) Foreign Application Priority Data

Nov. 25, 2011   (DE) .......................... 10 2011 055 738

(51) Int. Cl.
*H04B 5/00*    (2006.01)
*G06F 13/14*    (2006.01)
*H04L 12/24*    (2006.01)

(52) U.S. Cl.
CPC .............. *H04B 5/0031* (2013.01); *G06F 13/14* (2013.01); *H04L 12/24* (2013.01)
USPC ......................................... 455/41.1; 340/10.1

(58) Field of Classification Search
CPC ........................ H04L 29/08648; H04L 12/803
USPC ...................... 455/39, 41.2, 422.1, 411, 41.1; 340/10.1, 505, 572.1
See application file for complete search history.

(56) References Cited

U.S. PATENT DOCUMENTS

| | | | |
|---|---|---|---|
| 6,034,618 A * | 3/2000 | Tatebayashi et al. | 340/5.8 |
| 6,466,771 B2 * | 10/2002 | Wood, Jr. | 455/101 |
| 7,183,940 B2 * | 2/2007 | Chuey | 340/12.23 |
| 7,386,275 B2 | 6/2008 | Pirzada et al. | |
| 7,471,200 B2 | 12/2008 | Otranen | |
| 7,715,795 B2 | 5/2010 | Pirzada et al. | |
| 7,821,399 B2 | 10/2010 | Otranen | |
| 8,060,010 B2 * | 11/2011 | Breitfuss | 455/41.1 |
| 2006/0205354 A1 | 9/2006 | Pirzada et al. | |
| 2007/0001853 A1 | 1/2007 | Otranen et al. | |
| 2008/0248751 A1 | 10/2008 | Pirzada et al. | |
| 2009/0051498 A1 | 2/2009 | Otranen | |
| 2011/0275316 A1 | 11/2011 | Suumaki et al. | |

FOREIGN PATENT DOCUMENTS

| | | |
|---|---|---|
| CN | 1832425 A | 9/2006 |
| CN | 101233699 A | 7/2008 |
| WO | 2009058122 A1 | 5/2009 |

\* cited by examiner

*Primary Examiner* — Sonny Trinh
(74) *Attorney, Agent, or Firm* — Murphy, Bilak & Homiller, PLLC

(57) ABSTRACT

A communication method for the communication between two appliances which are set up for communication in a first communication mode is provided. The method includes sending an activation sequence in a second communication mode from the first to the second appliance in order to initiate communication based on the first communication mode; sending data from the second appliance to the first appliance based on the first communication mode. The activation sequence sent to the second appliance includes an initialization sequence and a request for data communication in the first communication mode. In addition, a corresponding electronic appliance and system are provided.

20 Claims, 4 Drawing Sheets

200

COMMUNICATION METHOD BETWEEN ELECTRONIC APPLIANCES, AND CORRESPONDING APPLIANCES

PRIORITY CLAIM

This application claims priority to German Patent Application No. 10 2011 055 738.5, filed on 25 Nov. 2011, the content of said German application incorporated herein by reference in its entirety.

TECHNICAL FIELD

The invention relates to communication methods between electronic appliances, and more particularly to communication methods between appliances which are used for near-field communication, specifically in the 13.56 MHz band, and to corresponding appliances.

BACKGROUND

It is expected that mobile electronic appliances will increasingly be equipped with additional radiofrequency (RF) communication functions in the future. By way of example, this relates to mobile telephones, portable media players, smartphones, personal digital assistants (PDAs), hand-held gaming consoles, tablet computers, laptop computers, etc. Besides their conventional functions, these appliances will therefore be capable of performing additional communication functions. The array of applications of RF communication functions include, in particular, contactless chip card functions, such as bookings, payments, purchases and the like, but also the simple user-initiated communication from terminal to terminal, for example for the exchange of photographs, MP3 songs or business cards. Such additional RF communication functions are increasingly implemented by using what is known as near-field communication technology (NFC).

NFC technology is a wireless short range connectivity technology which allows simple and secure two-way interactions between electronic appliances. This allows consumers to perform contactless transactions, to access digital contents and to connect electronic appliances and apparatuses. In other words, NFC technology allows contactless, bidirectional communication between appliances. These elements may be mobile telephones, computers, consumer electronics, cards, tags, signs, posters, washing machines and the like equipped with NFC. An appliance equipped with NFC technology can, in principle, operate in a read/write, peer-to-peer or card emulation mode.

NFC technology is standardized as contactless technology in the 13.56 MHz frequency band. The ISO-14443 standard is a cornerstone for a large amount of the near-field operations. NFC technology is generally compatible with at least the type A and type B ISO 14443 standards. The components of an NFC session comprise initiators and targets. The initiator is the element which begins and manages the communication and the interchange of data. The target responds to requests from the initiator. A feature of NFC technology is that elements can act either as an initiator or as a target. NFC technology requires a dedicated RF chipset and an antenna to be integrated in the mobile element.

Some NFC implementations relate to configurations in which the ISO 14443 standard is mapped onto a contact-based, transparent interface between, by way of example, an NFC front end and a secure element. In one implementation example based on ISO standard 14443-2/3/4, the protocol selection (protocol selection sequence) is defined as an initialization and anti-collision sequence in ISO/IEC14443-3. In this case, it typically takes a few milliseconds to perform this sequence before data can be transmitted on the application level. This time is necessary in order to initiate data interchange based on ISO/IEC14443-4 in the communication between an NFC front end and a secure element in a mobile terminal, such as a mobile telephone, for example. This time span may already be too long for time critical purposes and applications.

Against this backdrop, there is a need for methods and apparatuses which allow a communication method having improved properties.

SUMMARY

According to one exemplary embodiment, a communication method for the communication between two appliances which are set up for communication in a first communication mode is provided. The method comprises sending an activation sequence in a second communication mode from the first to the second appliance in order to initiate communication based on the first communication mode; sending data from the second appliance to the first appliance based on the first communication mode; wherein the activation sequence sent to the second appliance comprises an initialization sequence and a request for data communication in the first communication mode.

According to a further exemplary embodiment, a system comprising a first appliance and a second appliance is provided, with the appliances being connected by means of a communication interface, and being set up for communication in a first communication mode. In this case, the first appliance is set up to send an activation sequence in a second communication mode to the second appliance in order to initiate the sending of data by the second appliance based on the first communication mode, wherein the activation sequence sent from the first to the second appliance comprises an initialization sequence and a request for the data communication in the first communication mode.

In a further exemplary embodiment, an appliance is provided which has a communication interface and is set up for communication with a further appliance in a first communication mode. In this case, the appliance is set up to receive an activation sequence in a second communication mode in order to initiate the reception of data based on the first communication mode; wherein the activation sequence to be received by the appliance comprises an initialization sequence and a request for the data communication in the first communication mode.

The invention also relates to an apparatus for performing the disclosed methods and also comprises apparatus parts for performing respective individual method steps. These method steps can be performed by hardware components, by a computer programmed by means of appropriate software, by a combination of the two, or in any other way. The invention is furthermore also directed at methods according to which the respective described apparatuses operate. It contains method steps for performing every function of the apparatuses.

Those skilled in the art will recognize additional features and advantages upon reading the following detailed description, and upon viewing the accompanying drawings.

BRIEF DESCRIPTION OF THE DRAWINGS

The invention will be explained below with reference to exemplary embodiments which are shown in figures and which result in further advantages and modifications.

DETAILED DESCRIPTION

The text below describes various embodiments of the invention, some of which are also shown by way of example in the figures. In the description of the figures which follows, identical reference symbols refer to components which are the same or similar. Generally, only differences between various embodiments are described. In this context, features which are described as part of one embodiment can also readily be combined in connection with other embodiments in order to produce yet further embodiments.

Exemplary embodiments relate to the use of two different communication modes—one for the request and another for the response—in order to achieve rapid interchange of data between two appliances. One of the modes (subsequently called "second communication mode") is used for sending an activation sequence from the first to the second appliance, the activation sequence comprising an initialization sequence and a data request. Furthermore, the activation sequence may also comprise partial or full configuration of the subsequent sending of data from the second to the first appliance in the other communication mode (called "first communication mode").

In general, the exemplary embodiments relate to the communication between electronic appliances or elements. The appliances are set up as standard to communicate with one another in a first communication mode. This first communication mode may, by way of example, conforms to a standard according to which typically the hardware specifications, the interface topology, the bus timing, communication parameters, etc. of the connection/communication between the appliances are stipulated. Typically, prior to such communication, appliances negotiate with one another the parameters of such communication, which may require a substantial time involvement—depending on the standard or characteristic of the communication mode—before the actual data interchange begins, e.g. 1 to 20 milliseconds, typically 2 to 8 milliseconds. In exemplary embodiments, the communication between the appliances is extended by a second mode. In this case, the first appliance sends an activation sequence to the second appliance in the second communication mode. The second appliance is configured such that this signal initiates data communication back to the first appliance based on the first communication mode. Subsequently, the second appliance sends data to the first appliance in the first communication mode. In this case, the activation sequence initially sent to the second appliance comprises a plurality of parameters, namely at least one initialization sequence and a request for data communication in the first communication mode.

Figure 1:
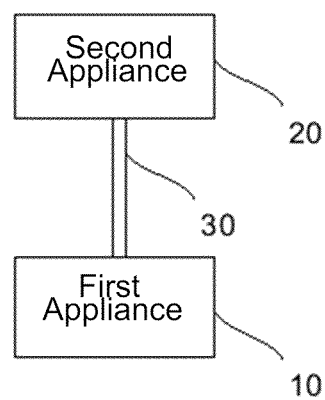
FIG. 1 shows a schematic illustration of a system with appliances based on exemplary embodiments.

FIG. 1 schematically shows a system 5 based on exemplary embodiments, comprising a first appliance 10, a second appliance 20 and an interface 30 that connects the appliances 10, 20. As already mentioned, the first appliance 10 may, in exemplary embodiments, be an NFC front end, and the second appliance 20 may be a secure element. By way of example, the system 5 may be part of a near-field communication system in a mobile terminal such as a mobile telephone, a tablet PC or any other terminal. A detailed description of the technical properties of the NFC front end and of a secure element is dispensed with here, since these are sufficiently well known to a person skilled in the art. Details can also be taken from the ISO 14443 standard, the content of which is incorporated herewith by way of reference in its entirety.

Figure 2:
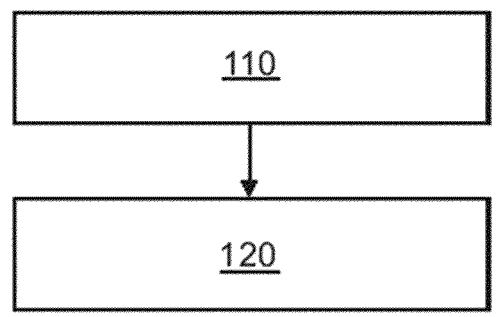
FIG. 2 schematically shows a communication method based on exemplary embodiments.

FIG. 2 schematically shows the flow of communication based on a communication method 100 for the communication between the two appliances 10, 20 shown in FIG. 1, which are set up for communication in a first communication mode via the interface 30. In a first block 110, the method comprises sending an activation sequence in a second communication mode from the first appliance 10 to the second appliance 20 in order to initiate communication based on the first communication mode. In a second block 120, data are sent from the second appliance 20 to the first appliance 10 in the first communication mode. In this case, the activation sequence sent to the second appliance 20 comprises at least one initialization sequence and a request for data communication in the first communication mode. Optionally, in exemplary embodiments, it is also possible to achieve partial or full configurability for the subsequent data transmission in the first mode by means of the configuration data which are sent together with the activation sequence in the second mode. By way of non-limiting example, these configuration data may contain statements about the bit rate at which transmission is subsequently intended to take place, the magnitude of the volume of requested data, and/or the (logical) address range from which the data are intended to be read.

In accordance with exemplary embodiments, the second appliance 20 is in this case designed such that it automatically recognizes the received message (activation sequence) in the second communication mode as a send command which is characterized by the initialization sequence and the request for data communication. The time between the sending of the activation sequence and the beginning of the actual data sending by the second appliance 20 can be significantly shortened by means of this method, since a protocol overhead, as required by the standard that is typically used for the first communication mode, is largely dispensed with. In other words, the time from the sending of the activation sequence by the first appliance 10 up to the beginning of the data sending by the second appliance 20 can be drastically shortened by the method described herein, in comparison with the communication in the first communication mode.

In exemplary embodiments, the first communication mode conforms to ISO 14443 at a first carrier frequency of 13.56 MHz. The second communication mode operates on a second carrier frequency from 150 kHz to 2 MHz, even more typically from 200 kHz to 800 kHz. In an implementation example based on ISO standard 14443-2/3/4, the protocol selection (protocol selection sequence) is described in ISO/IEC14443-3. In this case, on the basis of the standard, that is to say in the first communication mode, it typically takes a few milliseconds to perform this sequence before data can be transmitted on the application level. By interposing the method described herein, this time span, that is to say 1 to 20 milliseconds, or more typically 2 to 8 milliseconds, can be reduced to typically a few hundred microseconds.

The first and second communication modes therefore differ at least in the carrier frequency used, which can therefore be regarded as a characteristic feature of the respective mode. In exemplary embodiments, the sending of the data from the second appliance 20 to the first appliance 10 (following reception of the activation sequence) is delayed by the second appliance 20 until it has at least again detected a characteristic feature of the first communication mode, typically the first carrier frequency of the first mode. That is to say that after the second appliance 20 has received the activation sequence on the second carrier frequency, it sends the requested data only after it has detected that the first appliance 10 has switched back to the first mode and is ready to receive.

If the communication is taking place between an NFC front end and a secure element, the communication in the first communication mode would take place as standard on the level of an application layer based on the OSI layer model, that is to say on layer level 6 or 7, for example. The interposition of the second communication mode with the activation sequence shifts the level of the data interchange to a lower layer of the OSI layer model however. Furthermore, the second communication mode can be distinguished from the first mode by a different transmission and coding method. After data have been transmitted for the first time in the first mode according to the method described herein, any further communication may be a hybrid form of the first and second communication modes.

Figure 3:
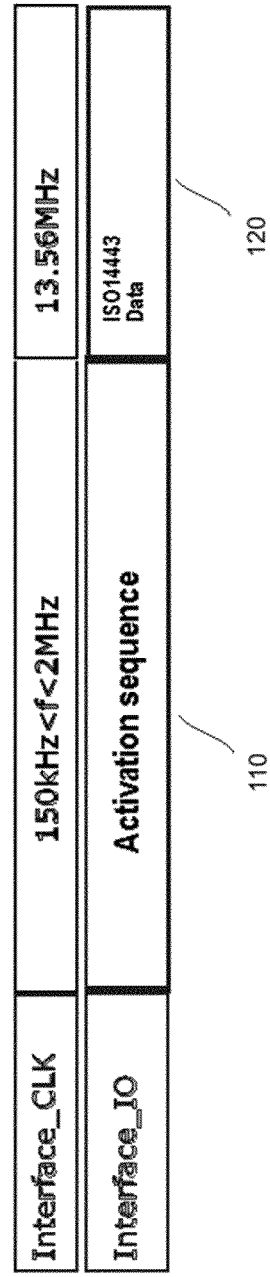
FIG. 3 schematically shows an example of a signal scheme based on exemplary embodiments.

FIG. 3 schematically shows signaling sequences based on exemplary embodiments. The top bar shows the clock frequency or carrier frequency of the interface 30 (Interface_CLK) during the method 100. The bottom bar shows the signal transmission (Interface_IO) in sync therewith. In the first block 110, the clock line of the interface 30 bears a second carrier frequency f (in the range from 150 kHz to 2 MHz), while the data line (Interface_IO) is used to send the activation sequence. In the second block 120, data are sent on the basis of ISO14443, while the clock frequency is the first carrier frequency of 13.56 MHz.

Figure 4:
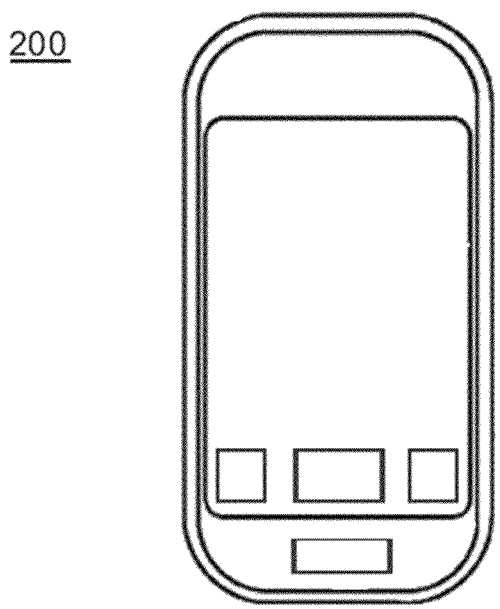
FIG. 4 shows a mobile terminal based on exemplary embodiments.

FIG. 4 shows a mobile terminal 200 with a short range communication system based on ISO 14443, which comprises a system 5 and appliances 10, 20 based on exemplary embodiments and implements the described method 100. In embodiments, the mobile terminal 200 may be a portable media player, a smartphone, a personal digital assistant (PDA), a hand-held gaming console, a tablet computer, a smartcard or a personal computer, particularly a laptop.

A person skilled in the art readily understands that not only can the method described herein be performed in the variants described in detail, it can also, in principle, be used for a multiplicity of applications. In particular, it is suitable for electronic appliances implemented on the basis of a standard which are intended to have the standard data communication between appliances or elements speeded up.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of communication between two appliances set up for communication in a first communication mode, the method comprising:

sending an activation sequence in a second communication mode from the first to the second appliance in order to initiate communication based on the first communication mode;

sending data from the second appliance to the first appliance based on the first communication mode;

wherein the activation sequence sent to the second appliance comprises:

an initialization sequence; and a request for data communication in the first communication mode.

2. The method according to claim 1, wherein the activation sequence contains a piece of configuration information for the requested communication in the first communication mode.

3. The method according to claim 1, wherein the sending of the data from the second appliance to the first appliance is delayed until the second appliance has detected at least one characteristic feature of the first communication mode.

4. The method according to claim 3, wherein the characteristic feature comprises a carrier frequency.

5. The method according to claim 1, wherein the first communication mode and the second communication mode have different carrier frequencies.

6. The method according to claim 1, wherein the first communication mode operates with a carrier frequency of 13.56 MHz and the second communication mode operates on a carrier frequency of 150 kHz to 2 MHz.

7. The method according to claim 1, wherein the first communication mode conforms to ISO 14443.

8. The method according to claim 1, wherein the first appliance is a near-field communication front end and the second appliance is a secure element.

9. The method according to claim 1, wherein an interface between the first and second appliances operates at a carrier frequency of 13.56 MHz.

10. The method according to claim 1, wherein the communication in the first communication mode takes place on a higher layer of the OSI layer model than the communication in the second communication mode.

11. The method according to claim 1, wherein the first and second communication modes differ in carrier frequency and coding method.

12. A system, comprising:

a first appliance and a second appliance connected by means of a communication interface and which are set up for communication in a first communication mode, the first appliance operable to send an activation sequence in a second communication mode to the second appliance in order to initiate sending of data by the second appliance based on the first communication mode;

wherein the activation sequence sent from the first to the second appliance comprises:

an initialization sequence; and a request for the data communication in the first communication mode.

13. The system according to claim 12, wherein the activation sequence contains a piece of configuration information for the requested communication in the first communication mode.

14. The system according to claim 12, wherein the first appliance is a near-field communication front end and the second appliance is a secure element.

15. An electronic appliance, comprising:

a communication interface operable for communication with a further appliance in a first communication mode, the electronic appliance being operable to receive an activation sequence in a second communication mode in order to initiate reception of data based on the first communication mode;

wherein the activation sequence to be received by the electronic appliance comprises:
- an initialization sequence; and
- a request for the data communication in the first communication mode.

16. The electronic appliance according to claim 15, wherein the activation sequence contains a piece of configuration information for the requested communication in the first communication mode.

17. The electronic appliance according to claim 15, wherein the electronic appliance is a secure element.

18. A mobile terminal, comprising:
- a first appliance and a second appliance connected by means of a communication interface and which are set up for communication in a first communication mode, the first appliance operable to send an activation sequence in a second communication mode to the second appliance in order to initiate sending of data by the second appliance based on the first communication mode;

wherein the activation sequence sent from the first to the second appliance comprises:
- an initialization sequence; and
- a request for the data communication in the first communication mode.

19. The mobile terminal according to claim 18, wherein the mobile terminal is a mobile telephone, a portable media player, a smartphone, a personal digital assistant (PDA), a hand-held gaming console, a tablet computer, a smartcard, a personal computer, or a laptop.

20. The mobile terminal according to claim 18, wherein the activation sequence contains a piece of configuration information for the requested communication in the first communication mode.

* * * * *